United States Patent
Jessup et al.

(10) Patent No.: US 7,295,118 B2
(45) Date of Patent: Nov. 13, 2007

(54) LOW COST RFID SYSTEM

(75) Inventors: Steven Jessup, Meridian, ID (US);
Richard L. Hicksted, Reno, NV (US);
Michael A. Spahr, Reno, NV (US)

(73) Assignee: Ensyc Technologies, Reno, NV (US)

( * ) Notice: Subject to any disclaimer, the term of this patent is extended or adjusted under 35 U.S.C. 154(b) by 134 days.

(21) Appl. No.: 11/208,220

(22) Filed: Aug. 19, 2005

(65) Prior Publication Data
US 2007/0040681 A1 Feb. 22, 2007

(51) Int. Cl.
*G08B 13/14* (2006.01)

(52) U.S. Cl. ............. 340/572.1; 340/10.1; 235/462.11

(58) Field of Classification Search .. 340/572.1–572.9, 340/10.1, 10.4; 235/462.11, 462.25; 455/41.1
See application file for complete search history.

(56) References Cited

U.S. PATENT DOCUMENTS

| | | | |
|---|---|---|---|
| 4,360,810 A | 11/1982 | Landt | 343/65 R |
| 5,649,296 A | 7/1997 | MacLellan et al. | 455/38.2 |
| 6,169,474 B1 | 1/2001 | Greeff et al. | 340/10.1 |
| 6,243,012 B1 | 6/2001 | Shober et al. | 340/572.7 |
| 6,249,227 B1 | 6/2001 | Brady et al. | 340/572.1 |
| 6,420,961 B1 | 7/2002 | Bates et al. | 340/10.1 |
| 6,456,668 B1 | 9/2002 | MacLellan et al. | 375/283 |
| 6,639,509 B1 | 10/2003 | Martinez | 340/10.4 |
| 6,745,008 B1 | 6/2004 | Carrender et al. | 455/41.1 |
| 6,765,476 B2 | 7/2004 | Steele et al. | 340/10.4 |
| 6,868,073 B1 | 3/2005 | Carrender | 370/278 |
| 6,879,809 B1 | 4/2005 | Vega et al. | 455/41.1 |
| 6,899,476 B1 | 5/2005 | Barrus et al. | 400/76 |
| 6,929,412 B1 | 8/2005 | Barrus et al. | 400/76 |
| 6,950,009 B1 * | 9/2005 | Nysen | 340/10.41 |
| 7,009,515 B2 * | 3/2006 | Carrender | 340/572.1 |
| 2006/0111051 A1* | 5/2006 | Barink et al. | 455/70 |

* cited by examiner

*Primary Examiner*—Phung T. Nguyen
(74) *Attorney, Agent, or Firm*—Stephen M. Nipper; Derek H. Maughan; Dykas, Shaver & Nipper, LLP

(57) ABSTRACT

A low cost close range RFID Reader/Writer which is operatively connected to a control device which contains a transmitter and is configured to function as a homodyne receiver. The device can be constructed from low cost parts and can function in close ranges to other tags. The present invention provides increased RFID identification and isolation properties and is suitable for inclusion and operative use with a variety of applications.

17 Claims, 3 Drawing Sheets

LOW COST RFID SYSTEM

BACKGROUND OF THE INVENTION

1. Field of the Invention

The present invention generally relates to identification systems and more particularly to wireless identification systems that utilize electronically sensitive tags to store and provide identification information.

2. Background Information

Radio Frequency Identification Systems (RFIDs) are used in a variety of industries to identify, track, and provide various other types of information related to the items upon which the tag is placed. A typical RFID system is usually made up of at least one transmitting and receiving device commonly called a reader and at least one passive or active target device, typically called a tag. The basic principal of this system involves the transmission of radio frequency energy from the reader to the tag. The tag receives the signal, modifies that energy and reflects this modified signal back to the reader, where the reflected and modified return signal is received, read and decoded. Some configurations also contain writers which enable various forms of information to be written back on to the tag.

RFID systems can be used in a variety of applications. Most typically these systems are utilized in a configuration where a tag is typically placed upon something that moves and a reader is placed in the hands of a person who seeks to determine information regarding the item upon which the tag has been placed. In some instances, the tags have their own internal power source while in other circumstances the power to power the tag and transmit the signal are derived from the reader itself.

Most tags contain a receiver and modulating device for transmitting a modulated signal back to the reader. The reader contains an antennae means for receiving information from the tag and reading this information. The transmission of information and power between the reader and the tag is typically accomplished by the modulation of the RF carrier. In many instances the tag is what is called a passive tag, which receives power to modulate the signal only through the receipt of transmission material from the reader. In these instances the reader is maintained in the ON state to provide power to the passive tags and is pulsed off and on for short intervals following the prescribed modulation timing and amplitude variations of the specific tag classification.

Some passive tags incorporate a capacitive storage mechanism to provide the required power for these pulse intervals. In the reverse direction, (the transmission from the tag back to the reader is also referred to as the reverse link) information is oftentimes transferred using a backscatter technique. In this backscatter technique, radio frequency (RF) energy incident on the tag antennae is modulated by changing the impedance of the antenna and effectively changing the radar cross section (RCS) of the tag and the amplitude of the energy reflected back to the reader.

In other instances, the tag impedance is such that the tag absorbs the RF energy, which is then used to power the tag. The tag changes the antenna impedance following the timing requirements of the specific tag classification effectively increasing the reflectivity of the tag and amplitude of the backscattered carrier received at the Reader. In these systems, the reader provides power to passive tags by maintaining a constant RF carrier throughout the entire transaction with the tag.

In some circumstances, this constant sending of a signal combined with the backscattered response signals can be problematic particularly in applications where the reader is in close association with a plurality of tags or when the reader and the tags are in close contact with one another. This close association of the tags can cause the compression of signals as well as the compression of the modulated signals emanating from these tags. This results in signals which are difficult to separate or individually ascertain. Various attempts to separate these signals and these tags have proved to be either too expensive or technically unsuitable for use in such a system.

These weaknesses in the present systems have made the programming of RFID labels from a single location or device very difficult. Where such systems have been implemented, the equipment utilized to achieve these results has been too expensive to allow for widespread use of this technology or the use of this technology in conjunction with the many items in common commerce.

Attempts at designing a system and device that can be utilized in close areas have included the use of separate antennas, to each transmit and receive signals from the device. However, this methodology typically requires a large area to implement and further requires site specific research to evaluate the amount of isolation that can be achieved in a specific production environment. Other attempts at providing a low cost RFID tag with the required specificity have included the use of a ferrite circulator or a three decibel coupler to provide increased isolation between well-terminated ports. However, the cost of these parts makes them so expensive so as to reduce their applicability and use in various aspects of industry or commerce.

Therefore what is needed, is a low cost RFID system which allows individual tags to be isolated, selected, programmed and verified. Preferably, this system should be made of inexpensive parts, which allows the device to be manufactured cheaply and thus used in a broad range of applications. This low cost RFID system should be able to function in close environments even in the presence of other tags. The present invention provides these advantages and does so in a way that is sufficiently reliable and cost effective so as to be accessible and useful in a variety of varying embodiments.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention is a low cost radio frequency identification system that allows interactions between a reader/writer and an individual tag at close range in environments where multiple tags exist. The system includes a reader/writer that can both read and write EPC class 1 and Gen2 tags and includes the features necessary to identify the tag, verify proper operation, and optionally write specific data to the tag under the direction of a host controller. The system allows for these steps to be performed even when a plurality of other tags are in close proximity to the target tag.

The tags of the present invention most preferably include an electronic product code (EPC) that is used for item identification in accordance with a particular standard. At present there are three standards that have been widely accepted for this identification EPC Class 0, Class 1 and Gen2. While these standards have been described as preferred in the present invention, it is to be distinctly understood that the invention is not limited to these particular standards but that other standards, including future evolving standards may also be utilized according to the particular needs of the user. Typically, these standards include an air interface standard, electronic product code and a set of commands for reading and optionally writing the tag.

The reader/writer of the present invention can be utilized with a variety of types of tags, including tags which are included within printed labels, placed upon or formed within paper or which are otherwise made available for use tags. The present tags are not limited to use with any singular particular form of RFID tag.

Preferably, the reader/writers of the present invention provide power to the passive tags by maintaining a RF carrier throughout an entire transaction with these tags. While the reader of the present invention is intended for use in a limited environment, the tags of the invention by utilizing a standardized protocol are enabled to be read by a variety of types of readers which may be utilized in a wide variety of circumstances.

In the preferred embodiment of the invention, the reader and the tags of the invention are made up of inexpensive parts, and can be utilized in a wide variety of environments. In the preferred embodiment, the RFID reader is operatively connected to a sensor device which is able to sense the presence of an item within a designated location. Once the sensor has been activated, the reader/writer is then activated so as to send a signal out to the tag, which is in the designated distance from the sensor. In the preferred embodiment of the invention, the sensor is physically connected to the reader either through the same physical box device or through a cable connection device. However, it is to be distinctly understood that the invention is not limited to this embodiment but that the reader/writer of the present invention may be utilized in a variety of other embodiments including those embodiments where the activation of the reader/writer is independent of any activation by a sensor. In various embodiments of the invention, the reader/writer and the sensor may be operatively interconnected together or may be operatively connected through a control device such as a computer.

The reader/writer of the present invention preferably functions in a close range of about 6 inches between the tag and the reader. This close range allows the parameters of the present invention to be phase adjusted so as to allow for low cost parts to be utilized to achieve the desired results.

The reader/writer of the present invention includes a controller which is directly operatively connected to an RF transmitter, an amplifier, an acquisition switch and a transceiver. In the preferred embodiment of the invention the controller is indirectly connected to a directional coupler which sends transmission signals to an antenna and receives signals from the antenna system and sends this information to a mixer which sends this received information back to the processor through a pair of filters and a gate. This controller provides sufficient processing power to incorporate functionality that would otherwise require additional hardware circuitry and allows the main operating parameters of the device to be easily programmed into the device utilizing an industry standard serial bus. This controller includes and controls the various other components of the system so as to allow the reader to both transmit and receive information to and from a tag.

The system utilizes a technique called Frequency Hopping Spread Spectrum to spread the RF energy over a larger spectrum thus minimizing the interference. In a typical embodiment of this method, fifty independent channels are assigned and scanned in a pseudo-random sequence allocating one individual channel for approximately 0.4 seconds during a 20 second period. This allows the communication between the reader and the tag to occur at a significantly faster pace than the prior art methods and allows multiple reader/writer to Tag operations to occur in a single hop. This process significantly reduces and in many instances eliminates the interruption of reader-tag operations that occur from a loss of synchronization that may result in the middle of a reader-tag exchange. The use of this technique results in a much more uniform response from a tag compared to using a single frequency and avoids the nulls and peaks that are found in many non-anechoic space.

In the reader itself, a RF amplifier provides power into the antenna system. A microstrip directional coupler provides signal isolation and minimizes transmit insertion loss. A mixer converts the RF signal directly to baseband in a simple homodyne configuration. Once the parameters of the printer and the reader have been established this simple design will require the transmit path to be phase adjusted so as to allow for maximum backscatter at the nominal antenna to tag distance.

The output of the mixer is filtered and buffered to provide a baseband signal with a low impedance drive. The subsequent DC acquisition circuit will acquire and subtract the DC level resulting from the isolated carrier. The baseband amplifier will provide a gain to be sampled by the integral A/D converter and subsequently processed by the microcontroller. The receiver mixes the RF signal directly to the baseband by operating the local oscillator at the transmit frequency.

By synchronizing the acquisition filter with the transmit modulation, the DC level associated with the carrier can be subtracted from the signal prior to the base band amplifier, effectively providing a fast acquisition band-pass filter at the designated signal modulation frequency. The homodyne receiver utilized in this invention includes a local oscillator with significantly low phase noise so as to provide an adequate noise floor to reliably demodulate backscatter signal. The transmit carrier at the receiver utilizes frequency hopping spread spectrum (FHSS) to spread the RF energy over a larger spectrum, thus minimizing interference. This technique results in a much more uniform response from a tag compared to using a single frequency and avoids the nulls and peaks that are found in any non-anechoic space.

By utilizing this system, communication between the reader/writer and the tag occur at a significantly faster pace and multiple reader/tag operations are permitted to occur in a single hop. This eliminates possible interruption of reader tag operations from loss of synchronization that may result in a hop in the middle of a reader/tag transaction. The use of FHSS minimizes the requirements for shielding the transmitter wires. The antenna of the present invention is formed in a tightly contained pattern so as to avoid activating tags other than the desired target tag toward which the device is intended.

In one of the uses of the present invention, a plurality of the RFID tags are each individually contained within a label. Each of these labels have a first side configured to be printed upon and a second side which contains an adhesive which would allow these tags to be affixed to an item after this label is printed. The RFID reader of the present invention is placed together with a label printer in close physical proximity to the printer so as to allow a user to print, read, code and verify labels from a single location. This printer is in turn connected to a control mechanism which dictates the type and form of information which can be printed upon the label. When commanded by the control device, the label in the printer is printed and forwarded out of the device to another location. When this label passes out of the printer this label then passes past a sensor on the reader device. Preferably, this sensor is an optical sensor which determines when a label is in place near the reader and activates the reader to read and code the tag.

When the label passes over the sensor, the reader/writer mechanism is activated and the reader makes multiple read attempts to attempt to determine the identity of the RFID tag which is connected to the label. If the tag is successfully read then the scanner is activated and the bar code on the label is read, if the tag and the bar code and the tag are both successfully read, the data handler signals the RFID reader/writer to write information to the tag. This information is then verified. If the tag passes through all of these steps successfully, then the tag may be utilized and placed upon a particular item. If the tag fails to pass any of these steps after various attempts to troubleshoot and rectify the problem the tag is not written and is not suitable for use.

The purpose of the foregoing Abstract is to enable the United States Patent and Trademark Office and the public generally, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

DESCRIPTION OF THE PREFERRED EMBODIMENTS

Figure 1:
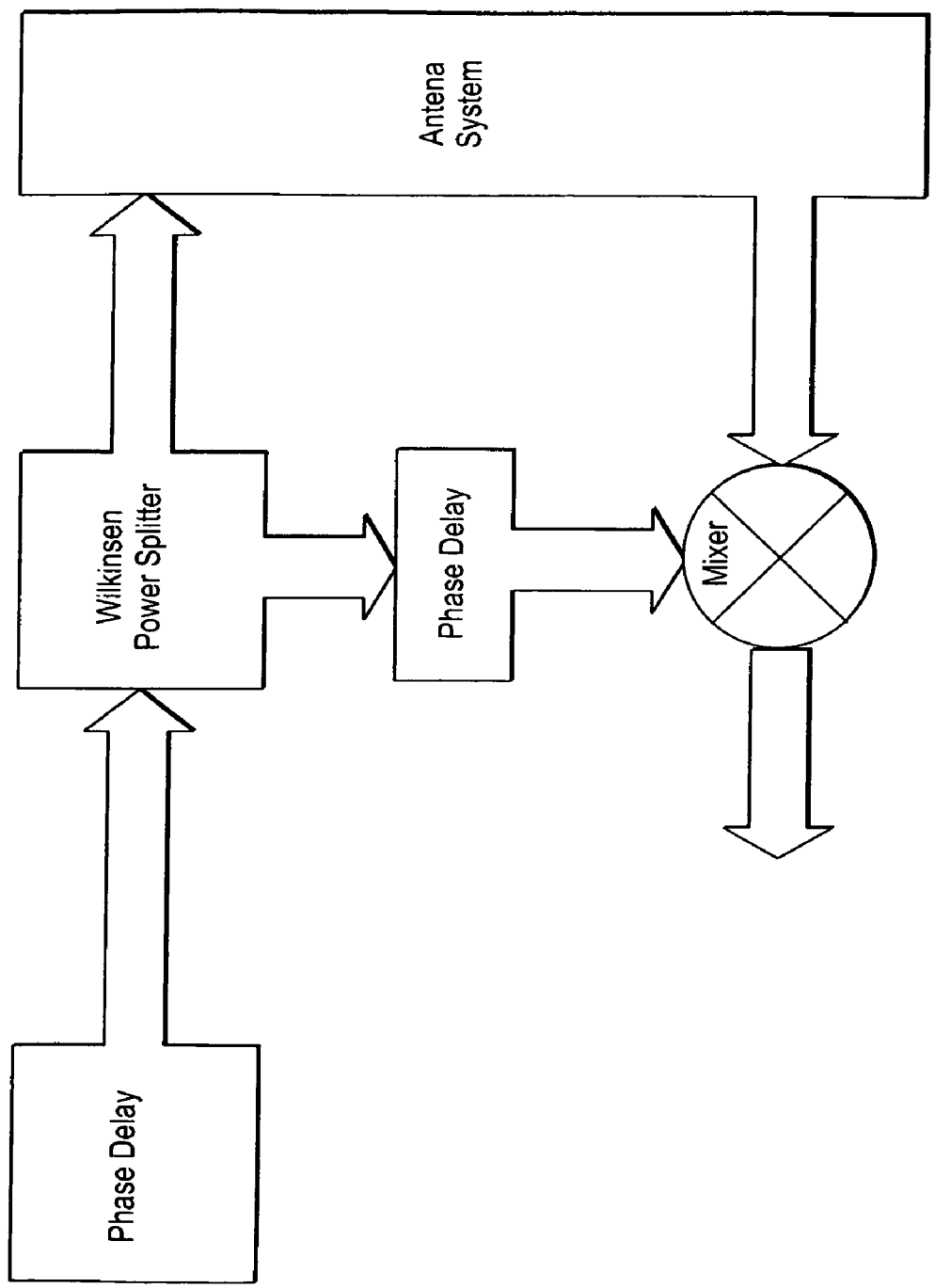
FIG. 1 is a conceptual block diagram of the principal features of the reader of the present invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

The preferred embodiment of the present invention is a system for RFID communications. A key component of this invention is a RFID reader/writer device that is preferably configured to operate in the ISM band of 902 to 928 megahertz in the U.S. utilizing a frequency hopper spread spectrum or FHSS technique to meet appropriate FCC requirements. In other countries, the particular bandwidth in which the device operates can be varied so as to comply with the specific necessities of the user in those countries. The design of the present invention includes a transmitter which is adjustable over a frequency range of 804 megahertz to 940 megahertz employing FHSS using 50 hop channels according to the FCC requirements. Additionally, the output power is preferably adjustable from 70 dBm to 30 dBm. The particular ISM band and power output listed above is merely illustrative in nature and are not limiting in any way. Depending upon the specific regulatory mechanisms involved in various particular countries the exact specifications of the individual devices and their relative operating parameters may be altered according to the particular location in which the device is utilized.

FIG. 1 shows the overall conceptual configuration of the reader of the present invention. The reader/writer of the present invention is a homodyne receiver and transmitter device made up of a single channel RF oscillator. In the preferred embodiment of the invention, this device is comprised of a single RF oscillator which is operatively connected to a power splitter. This power splitter propagates output from the RF oscillator to both the antenna system as well as to a mixer. This configuration provides a significant advantage over the prior art in that this device allows for the carrier and the local oscillator to each operate at the same frequency. In most prior art devices, homodyne receivers require the presence of a double balanced mixer and quadrature components of a local oscillator to minimize the nulls encountered in a multi-path environment. However in the present invention, the application is intended for the reader/writer to function at a distance of between three and six inches from the tag. This distance allows for a device operating a 900 Mhz to function at the points of the half wavelength and the transmitter and receiver can be tuned so as to allow the nulls to be positioned at the extremities of the path tolerance. This removes the additional cost which is found in many of the prior art devices, while still maintaining a device that functions properly in the intended environment.

Figure 2:
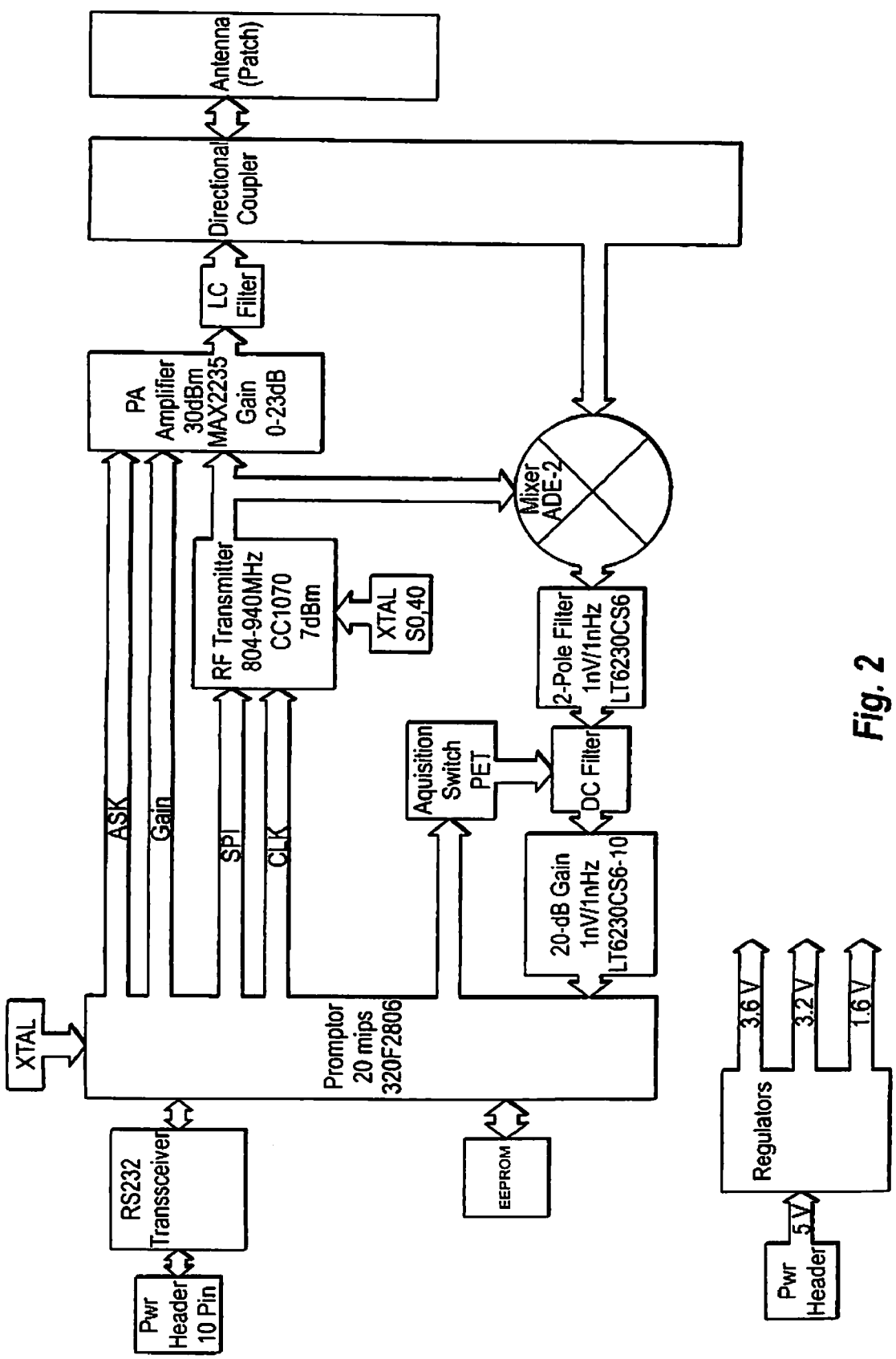
FIG. 2 is a conceptual block diagram of the reader of the present invention.
Figure 3:
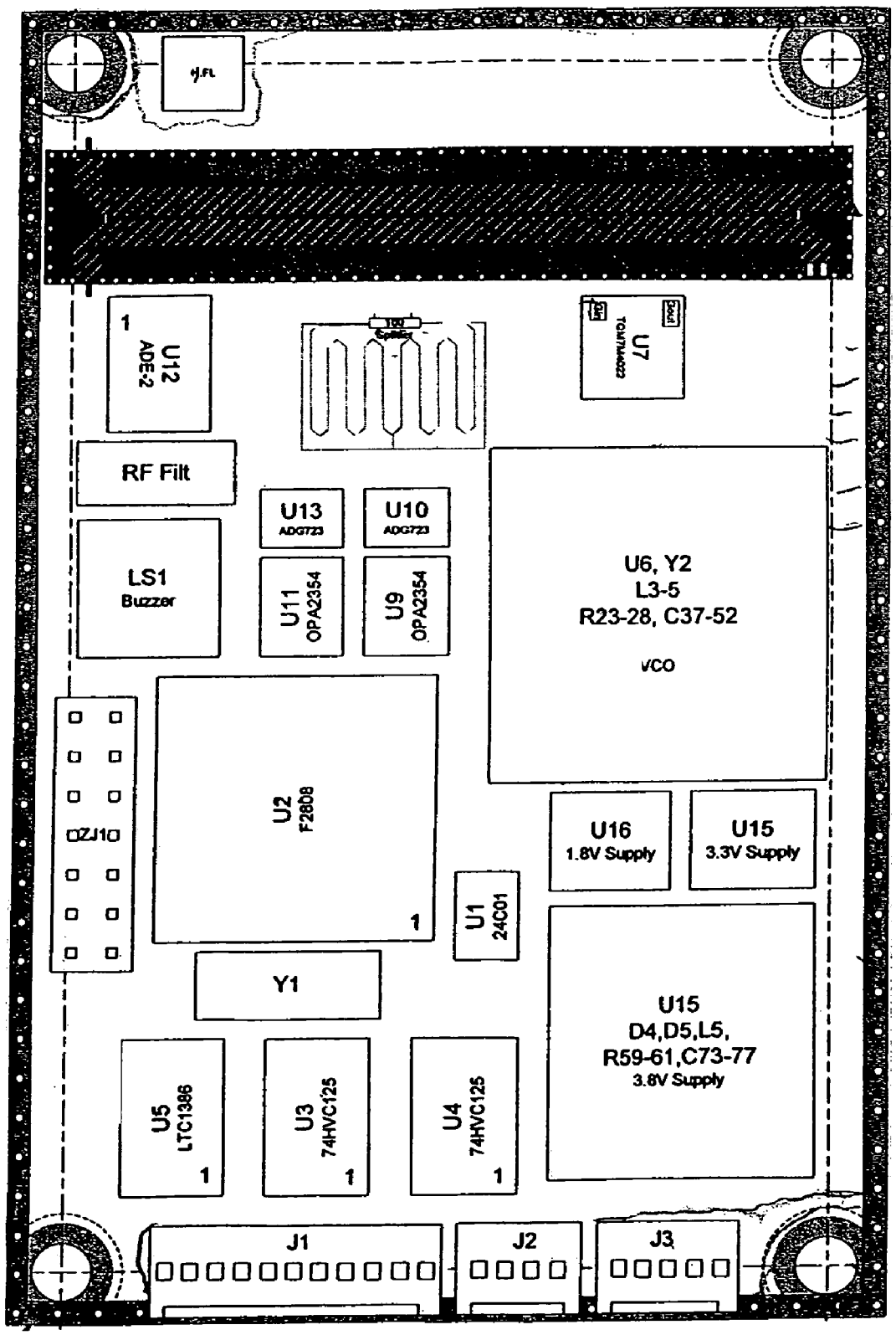
FIG. 3 is demonstrative drawings of the assembly of components in the preferred embodiment of the invention.

FIG. 2 shows the conceptual design of the present preferred embodiment of the reader/writer portion of the invention. The most preferred embodiment of the present invention is a homodyne receiver and transmitter. FIG. 2 shows the presence of a controller which is directly operatively connected to an RF transmitter, an amplifier, an acquisition switch and a transceiver. These basic pieces provide a low cost reader configuration which can be utilized in a variety of configurations including particularly, within closely spaced applications, such as in conjunction with a label printer. The preferred embodiment of the invention includes a homodyne receiver which mixes the RF signal directly to the baseband by operating the (LO) local oscillator at the transmit frequency. This synchronization and carrier rejection is accomplished by using a DC acquisition filter under the control of a high-speed microcontroller. By synchronizing the acquisition filter with the transmit modulation, the DC level can be subtracted from the signal prior to the base band amplifier, effectively providing a fast acquisition band pass-filter at the signal modulation frequency. One of the important keys to the invention is to incorporate a local oscillator with significantly low phase noise to provide an adequate noise floor to reliably demodulate backscatter signal.

The present invention does not require the use of a low noise amplifier because of the relatively large backscatter. Eliminating this low noise amplifier provides a significant dynamic range. This dynamic range can be enhanced by the inclusion of a low cost passive mixer, which further enhances the dynamic range of the device with minimal conversion loss.

The controller contains an integral voltage current oscillator (VCO), which is controlled by the controller and minimizes low phase noise. An RF amplifier provides power into the antenna system. A microstrip directional coupler provides signal isolation and minimizes transmit insertion loss. A mixer converts the RF signal directly to baseband in a simple homodyne configuration. This configuration allows for signals to be sent and received by this reader/writer in a way that is functionally proficient and which also can be done with components that are of sufficiently low cost so as to allow these readers to be of such a low cost so as to allow RF tags to be used in a variety of industries and with a variety of products which were previously unobtainable due to these cost restraints.

The present invention utilizes a Frequency Hopping Spread Spectrum (FHSS) technique to spread the RF energy over a large spectrum thus minimizing interference. This technique also results in a much more uniform response emanating from a tag compared to using a single frequency and avoids the nulls and peaks that are found in many non-anechoic spaces. In a typical embodiment of this method, fifty independent channels are assigned and scanned in a pseudo-random sequence allocating one individual channel for approximately 0.4 seconds during a 20 second period. This allows the communication between the reader and the tag to occur at a significantly faster pace than the prior art methods and allows multiple reader/writer to tag operations to occur in a single hop. This process significantly reduces and in many instances eliminates the interruption of reader-tag operations that occur from a loss of synchronization that may result in the middle of a reader-tag exchange.

The output of the mixer of the present invention is filtered and buffered to provide a baseband signal with a low impedance drive. The baseband amplifier will provide a gain to be sampled by the integral A/D converter and subsequently processed by the microcontroller. This microcontroller also provides a variety of other functions such as acting as a slicer to filter, edge detect and decode messages received from the tags. The receiver mixes the RF signal directly to the baseband by operating the local oscillator at the transmit frequency. Using a DC acquisition filter under the control of a high-speed microcontroller prevents high-speed rejection. By synchronizing the acquisition filter with the transmit modulation, the DC level associated with the carrier can be subtracted from the signal prior to the base band amplifier, effectively providing a fast acquisition bandpass filter at the signal modulation frequency. The homodyne receiver utilized in this invention is made from discrete components.

The antenna of the present invention preferably contains a tightly contained pattern to avoid activating additional tags in the printer. The antenna incorporates a mechanism to provide a minimum of 25 dB carrier isolation. Dipoles can provide isolation, however they can also be detuned by the tag proximity. A modified transmission line using a section of microstrip with a thick dielectric and ground only under the trace terminated by 50 ohms has low sensitivity but is not easily detuned by the tag. Circular polarization is important when the tag orientation is unknown. For the printer application, linear polarization maybe used if tag orientation can be fixed. Cross polarization can also be used involving the use of crossed dipoles or a patch antenna.

The receiver includes a local oscillator with significantly low phase noise so as to provide an adequate noise floor to reliably demodulate backscatter signal. The transmit carrier at the receiver utilizes frequency hopping spread spectrum (FHSS) to spread the RF energy over a larger spectrum, minimizing interference. This technique results in a much more uniform response from a tag compared to using a single frequency and avoids the nulls and peaks which are found in any non-anechoic space. The advantages of frequency hopping, coupled with regulatory requirements have made FHSS a common component of most reliable RFID operations.

The receiver components of the present system reduce the transmit carrier at the receiver by 24-30 DB, provides a baseband bandwidth of at least 3.3 Mhz, and allows for RF DC recovery. This allows for the device to meet Federal Communication Commission requirements, and to function with EPC Class 0 tags. The present invention utilizes a passive mixer to avoid saturation from RF or IF Direct Current (DC). The baseband amplifier recovery must follow the RF DC recovery. DC acquisition is incorporated into the device to avoid DC errors at the bit slicer. The use of a single mixer as described above saves costs. In addition the Carrier and LO phase can also be adjusted to provide to maximum signal according to the path length. Reducing the LO phase noise to the minimum reduces the noise floor and improves the reliability of reception. A floor of −75 dBc/Hz is preferred.

The reader/writer of the present invention can be utilized with tags from any of the various classifications of tags, including EPC 0, EPC1 and GEN2 types of tags. The invention of this device is not however limited to use in conjunction with these tags and the use of other types of tags is also possible with the making of appropriate modifications to the Reader/Writer. A typical tag contains bits of data, which define various information about the tag and its contents. The type and configuration of these types of tags vary upon the type of tag that is being used. For purposes of illustration alone, the following information regarding EPC class 1 tags is provided.

EPC class 1 tags using backscatter modulation will only do so when directed by a properly decoded and interpreted command. Class 1 tags will respond to all properly decoded and interpreted commands and signals regardless of the emitting source. Communication between the reader/writer and a tag is packaged where a single packet includes a complete command from the reader/writer and a complete response from the tag. These communications are half-duplexed. The reader/writer initiates communication by modulating a complete command. The reader/writer then transmits an unmodulated continuous wave signal. The tag modulates it. A tag will not modulate backscatter while it is waiting for a communication from a reader/tag. Likewise a tag shall not interpret communication from a reader/writer while it is communicating. EPC class 1 tags contain a unique identifier which is stored in the Identifier Tag Memory (ITM) starting at location zero. Valid class 1 electronic product codes contain four sections: version, domain manager, object class and serial number. These sections contain information which dictate how these tags will react when provided with specific information from a reader/writer in the form of command codes. These command codes instruct the tags to perform functions such as identifying themselves, verifying their identification, respond to commands, communicate with the reader, shut themselves off for a period of time, lock their identification sequence, erase their identification, and in some rare instances, to permanently deactivate themselves. Tags can be programmed to accomplish various functions by the transmission of the appropriate code from the reader to the tag. Tags do not send commands back to the reader. These tags only execute commands issued by a reader and send feed back to the reader. These devices use gaps in the transmission to separate these various commands.

In this preferred embodiment shown in FIG. 2, the controller in the reader/writer is a Texas Instruments 320 F2806 100 MIPS DSP Microcontroller. This device provides sufficient processing power to incorporate functionality that would otherwise require additional hardware circuitry. An EEPROM is functionally connected to the processor and stores configuration parameters. The RF transmitter is a Chipcon CC1070 single chip low power RF Transmitter. This device incorporates a frequency synthesizer which can operate in the 804-940 MHz range and is especially suited for narrow band systems providing RF data ranges of up to 153.6 kBaud. The main operating parameters of the device are easily programmed into the controller or the EE-ROM using an industry standard serial bus.

The integral variable current oscillator provides a very low phase noise of 103 dBc/Hz at 100 kHz by a MAX2235 RF amplifier providing up to 30 dBm of power into the antenna system. The microstrip directional coupler is designed to provide a minimum of 25 dB isolation with a maximum of 1 dB transmit insertion loss. The directional coupler has a high receive injection loss, however, there is more than sufficient backscatter in this short-range design. The antenna design can be varied for both remote and local operation on a maximum 12-inch coaxial antenna. The design is optimized in a tight pattern with minimal tag detuning effects.

A microcircuits ADE-2 mixer will be used to convert the RF signal directly to baseband in a simple homodyne configuration. This simple design will require the transmit path to be phase adjusted for maximum backscatter at the nominal antenna to tag distance. This will avoid nulls over specified antenna to tag separation paths. The output mixer will be filtered and buffered to provide a baseband signal with a low impedance drive. The subsequent DC acquisition circuit will acquire and subtract the DC level resulting from the isolated carrier. The baseband amplifier will provide a gain on the order of 500 providing a nominal signal between 0.125 and 2 Volts to be sampled by the integral A/D converter and subsequently processing in the microcontroller. Power to the controller will be derived from provided 5 volts at 1.25 amps using a DC-DC converter and two low dropout regulators.

The preferred embodiment of the preferred invention is a homodyne receiver. This homodyne receiver mixes the RF signal directly to the baseband by operating the local oscillator at the transmit frequency. In one configuration of the invention, a double balanced mixer is used with quadrature components of the local oscillator to minimize the nulls encountered in multipath environments, however in the preferred embodiment of the invention this extra circuitry is eliminated. In the preferred embodiment of the invention the tag is operated within a gap somewhere between 3 and 6 inches. When operating at 900 MhZ the associated half wavelength is a little over 6 inches and the transmitter and receiver chain can be tuned so that any nulls in the wavelength are positioned at the extremities of the 3-inch path tolerance.

Signal clarification, specifically carrier rejection is accomplished using a DC acquisition filter under the control of the high-speed microcontroller. By synchronizing the acquisition filter with the transmit modulation, the DC level associated with the carrier can be subtracted from the signal prior to the base band amplifier, effectively providing a fast acquisition band-pass filter at the signal modulation frequency.

The preferred embodiment of the present invention utilizes a bandwidth appropriate for EPC class 0 modulation. The passive mixer avoids saturation of the signal from IF or RF DC and minimizes RF DC recovery for Class 0 tags. The present invention includes DC acquisition to avoid DC errors in the bit slicer. The present invention utilizes a single mixer to save costs. The maximization of the signal is achieved by adjusting the carrier and the local oscillator phase so as to obtain the maximum signal at the mid path length. The present invention uses 200 mS hop time, the entire read/write process must take place within this time, as the frequency hop will disrupt this process.

In the preferred embodiment of the present invention, the transmit carrier is reduced at the receiver by 24-30 dB. The use of the FHSS technique results in a much more uniform response from a tag compared to using a single frequency and avoids the nulls and peaks which are found in any non-anechoic space. The use of FHSS minimizes the requirements for shielding and transmitter wires.

When utilizing Class 1 and Gen 2 tags which involve the use of ASK detection, a single ended AC coupled amplifier with a DC acquisition circuit and either a comparator or firmware slicer to demodulate is utilized. EPC Class 0 tags will require additional hardware to detect the 2.2 Mhz and 3.3 Mhz signals. In the preferred embodiment of the invention the firmware slicer is a 50 MIPS DSP microcontroller which is configured to perform filtering, edge detection and decoding. Since the printer application only addresses a single tag, a simplified singulation process can be used to identify the Tag. In the preferred embodiment of the invention the power to operate the device requires only 3.3 volts to minimize regulator requirements.

The reader/writer of the present invention utilizes simple parts, which can be cost-effectively combined and utilized to obtain a reader/writer for use in achieving these ends, and provides an easily installable method and device for performing these functions.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A reader/writer for use in Radio Frequency Identification Systems comprising:

an oscillator;

a power splitter operatively connected between said oscillator and an antenna system, said power splitter further operatively connected to a mixer, said power splitter configured to receive input from said oscillator and to transmit a signal to said antenna system and to said mixer;

said mixer configured to receive input from said oscillator through said power splitter and input from said antenna system and to transmit a signal to another location.

2. The reader/writer for Radio Frequency Identification Systems of claim 1 further comprising: a directional coupler connected between said antenna system and said mixer.

3. The reader/writer for Radio Frequency Identification Systems of claim 1 wherein said Reader only contains one mixer.

4. The reader/writer for Radio Frequency Identification Systems of claim 1 wherein said power splitter is an amplifier.

5. The reader/writer for Radio Frequency Identification Systems of claim 1 further comprising a controller operatively connected to said mixer and to said oscillator.

6. The reader/writer for Radio Frequency Identification Systems of claim 1 further comprising a low current filter operatively connected between said oscillator and said antenna system.

7. A reader/writer for use in a Radio Frequency Identification System comprising:
   an oscillator operatively connected between a processor and an amplifier;
   said amplifier operatively interconnected between a processor and a low current filter;
   said low current filter operatively connected to a directional coupler, said directional coupler also operatively connected to an antennae and to a mixer, said mixer operatively connected to said processor through a series of gates and filters whereby said reader acts as a transmitter and homodyne receiver and can send and receive information.

8. The reader/writer of claim 7 wherein said transmitter is adjustable over the frequency range from 804 MHz to 940 MHz.

9. The reader/writer of claim 8 wherein said transmitter utilizes FHSS over 50 hop channels.

10. A system for reading and verifying radio frequency identification system tags comprising:
    a control device;
    at least one RFID tag;
    a sensor operatively connected to said control device, said sensor positioned so as to be activated when an object passes through a designated location;
    a RFID reader/writer, operatively connected to said control device, said RFID reader/writer comprising a controller operatively connected to an RF oscillating transmitter; a power splitter operatively connected to a phase delay device between said RF oscillator and an antennae system said power splitter configured to receive input from said RF oscillator and to transmit a signal to said antennae system and to a mixer; said mixer configured to receive power from said power splitter and input from said antenna system and to transmit said signal to another location, said control device configured to receive input from said sensor said scanner and said RFID reader and to perform the steps of a designated method.

11. The system of claim 10 wherein said RFID reader/writer further comprises a directional coupler connected between said antenna system and said mixer.

12. The system of claim 10 wherein said RFID reader/writer further contains only a single mixer.

13. The system of claim 10 wherein said power splitter is an amplifier.

14. The system of claim 10 wherein said RFID reader/writer further comprises a controller operatively connected to said mixer and to said oscillating transmitter.

15. The system of claim 10 further comprising a low current filter operatively connected between said oscillating transmitter and said antenna system.

16. The system of claim 10 wherein said oscillating transmitter is adjustable over the frequency range from 804 MHz to 940 MHz.

17. The reader of claim 10 wherein said transmitter utilizes FHSS over 50 hop channels.

* * * * *